(12) United States Patent
Ayala et al.

(10) Patent No.: US 7,958,622 B1
(45) Date of Patent: Jun. 14, 2011

(54) METHOD FOR MAKING SMART CARDS

(75) Inventors: Stephane Ayala, Marseilles (FR); Gerard Bourneix, Greasque (FR); Christine Beausoleil, Marseilles (FR); David Martin, La Ciotat (FR); Laurent Oddou, La Ciotat (FR); Philippe Patrice, Allauch (FR); Michael Zafrany, Marseilles (FR)

(73) Assignee: Gemalto S.A., Meudon (FR)

( * ) Notice: Subject to any disclaimer, the term of this patent is extended or adjusted under 35 U.S.C. 154(b) by 0 days.

(21) Appl. No.: 09/545,288

(22) Filed: Apr. 7, 2000

Related U.S. Application Data

(63) Continuation of application No. PCT/FR98/02147, filed on Oct. 8, 1998.

(30) Foreign Application Priority Data

Oct. 8, 1997 (FR) .................................. 97 12530

(51) Int. Cl.
*H01Q 13/00* (2006.01)
*H01Q 1/28* (2006.01)

(52) U.S. Cl. ............................ 29/600; 29/592.1; 235/492

(58) Field of Classification Search ................ 29/600, 29/825–827, 829, 830, 846; 235/492, 487; 235/380–385; 257/679–728, 992, 276; 343/866, 343/873

See application file for complete search history.

(56) References Cited

U.S. PATENT DOCUMENTS

| | | | |
|---|---|---|---|
| 4,689,636 A * | 8/1987 | Tait et al. ...................... 343/895 |
| 4,818,855 A | 4/1989 | Mongeon et al. | |
| 5,027,190 A * | 6/1991 | Haghiri-Tehrani et al. ... 257/679 |
| 5,208,450 A * | 5/1993 | Uenishi et al. ................ 235/492 |
| 5,337,063 A | 8/1994 | Takahira | |
| 5,488,380 A | 1/1996 | Harvey et al. | |
| 5,528,222 A | 6/1996 | Moskowitz et al. | |
| 5,598,032 A | 1/1997 | Fidalgo | |
| 5,640,306 A * | 6/1997 | Gaumet et al. ................ 361/737 |
| 5,671,525 A | 9/1997 | Fidalgo | |
| 5,779,839 A | 7/1998 | Tuttle et al. | |
| 5,809,633 A * | 9/1998 | Mundigl et al. ................ 29/600 |
| 5,852,289 A | 12/1998 | Masahiko | |
| 5,880,934 A * | 3/1999 | Haghiri-Tehrani ........... 361/737 |
| 5,920,290 A * | 7/1999 | McDonough et al. ........ 343/873 |
| 6,049,461 A * | 4/2000 | Haghiri-Tehrani et al. ... 361/737 |
| 6,088,230 A | 7/2000 | Finn et al. | |
| 6,164,551 A | 12/2000 | Altwasser | |
| 6,233,818 B1 | 5/2001 | Finn et al. | |
| 6,320,753 B1 * | 11/2001 | Launay ......................... 361/760 |
| 6,375,083 B2 * | 4/2002 | Fries et al. .................... 235/492 |
| 6,375,780 B1 | 4/2002 | Tuttle et al. | |
| 6,476,775 B1 * | 11/2002 | Oberle .......................... 343/895 |

(Continued)

FOREIGN PATENT DOCUMENTS

EP 0682321 A2 11/1995

(Continued)

*Primary Examiner* — Minh Trinh

(74) *Attorney, Agent, or Firm* — Buchanan Ingersoll & Rooney PC

(57) ABSTRACT

The invention concerns a method for making smart cards capable of operating with or without contact called mixed cards and contactless smart cards. In order to avoid the risk of deteriorating the antenna the method consists in producing an antenna comprising at least two turns, on a support sheet, said antenna having its turns located outside the connecting pads, and in providing an insulating bridge so as to connect each of the antenna ends to a connection pad respectively.

39 Claims, 4 Drawing Sheets

U.S. PATENT DOCUMENTS

| | | | | |
|---|---|---|---|---|
| 6,617,676 B1 * | 9/2003 | Oddou et al. | | 257/679 |
| 6,794,727 B2 * | 9/2004 | Leduc et al. | | 257/531 |
| 6,881,605 B2 * | 4/2005 | Lee et al. | | 438/106 |
| 6,886,246 B2 * | 5/2005 | Chung | | 29/832 |
| 6,957,481 B1 * | 10/2005 | Patrice | | 29/600 |
| 6,973,716 B2 * | 12/2005 | Chung et al. | | 29/832 |
| 7,663,564 B2 * | 2/2010 | Ayala et al. | | 343/741 |

FOREIGN PATENT DOCUMENTS

| | | |
|---|---|---|
| EP | 0723244 A2 | 7/1996 |
| EP | 0737935 A2 | 10/1996 |
| EP | 0756244 A2 | 1/1997 |
| FR | 2523335 | 9/1983 |
| WO | 97/34247 | 9/1997 |

* cited by examiner

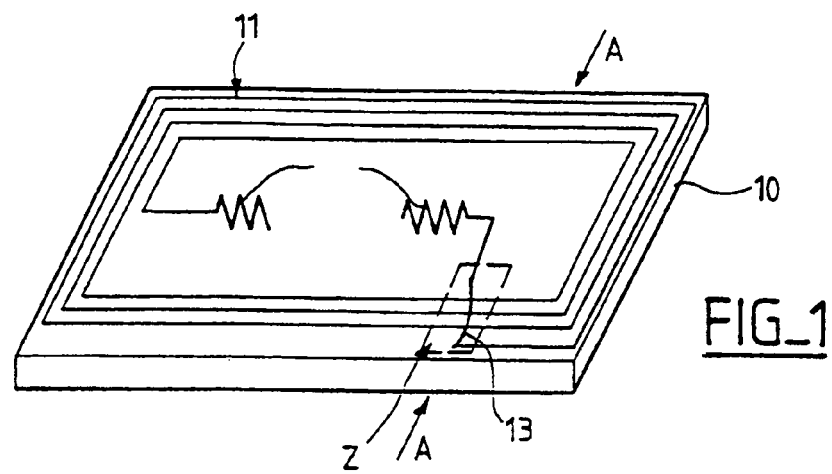
FIG_1
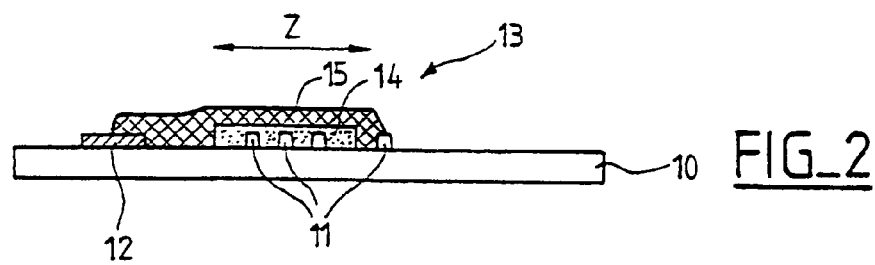
FIG_2
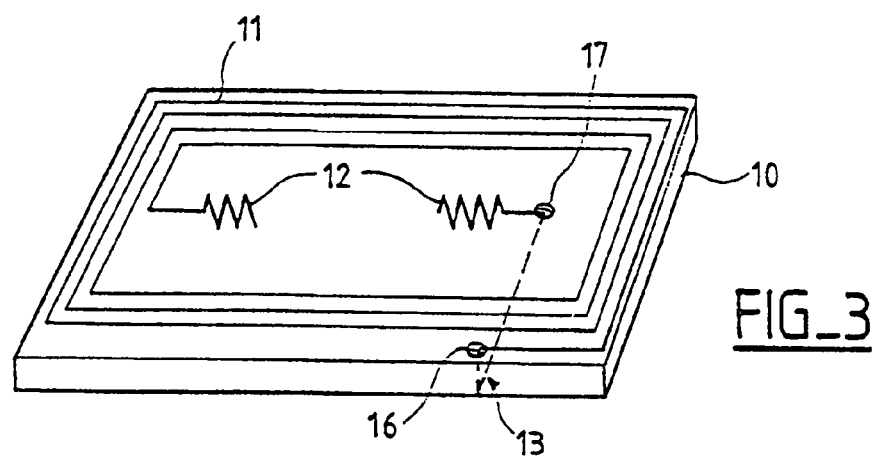
FIG_3
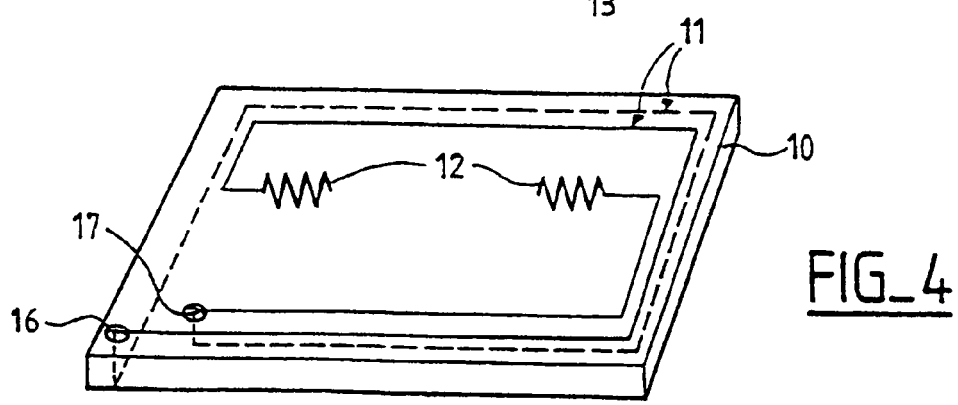
FIG_4

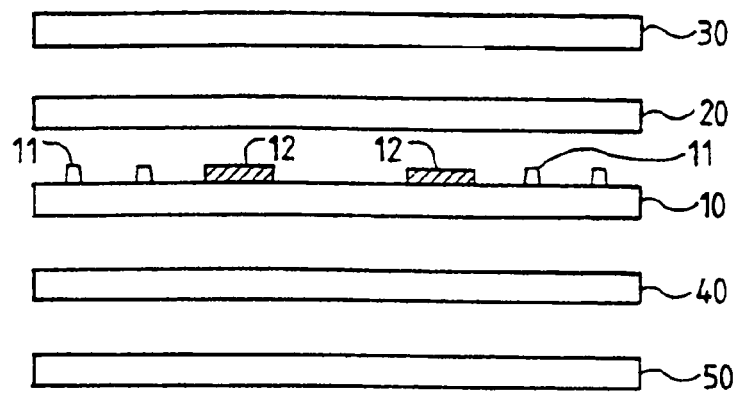
FIG_5A
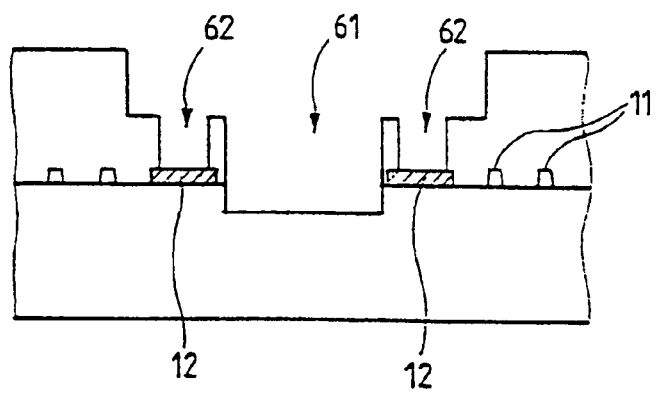
FIG_5B
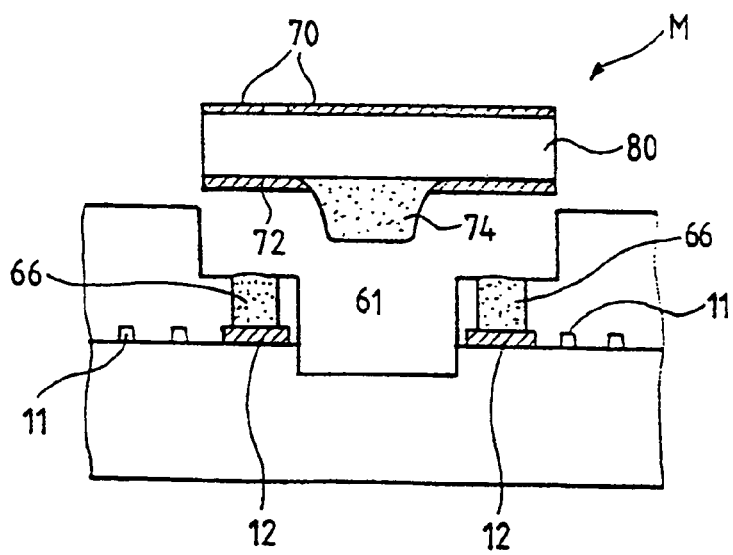
FIG_5C

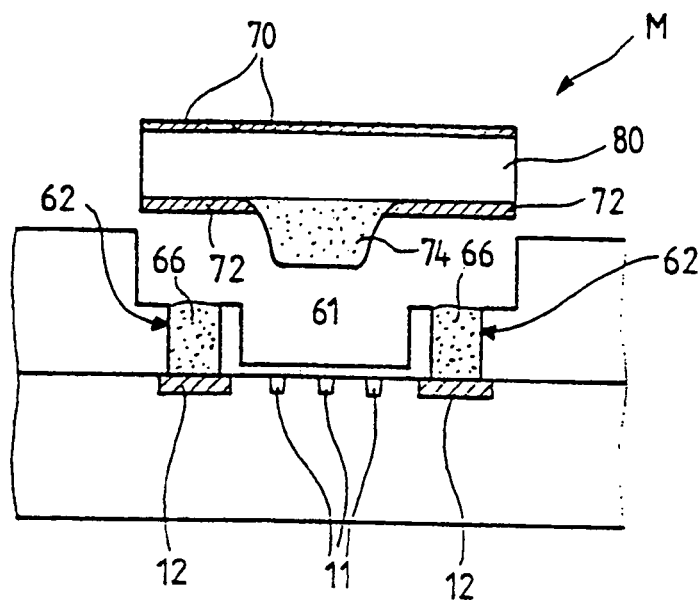
FIG_6
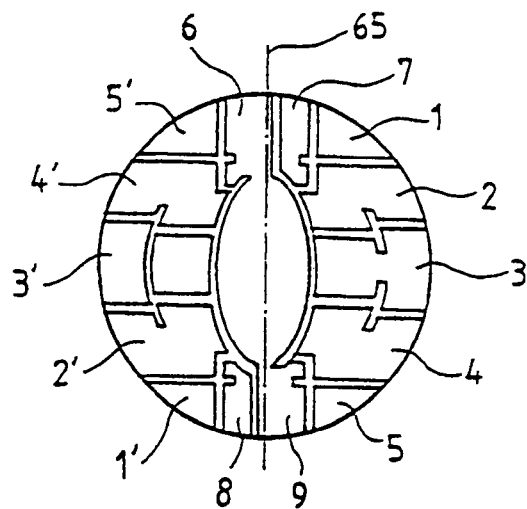
FIG_7A
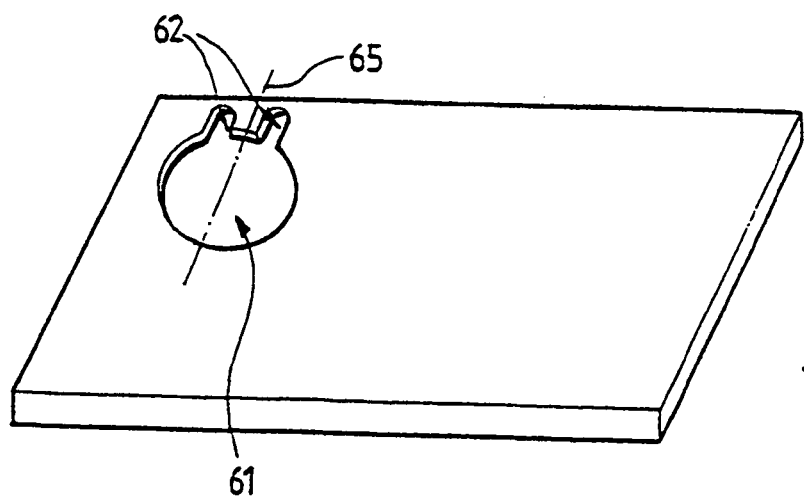
FIG_7B

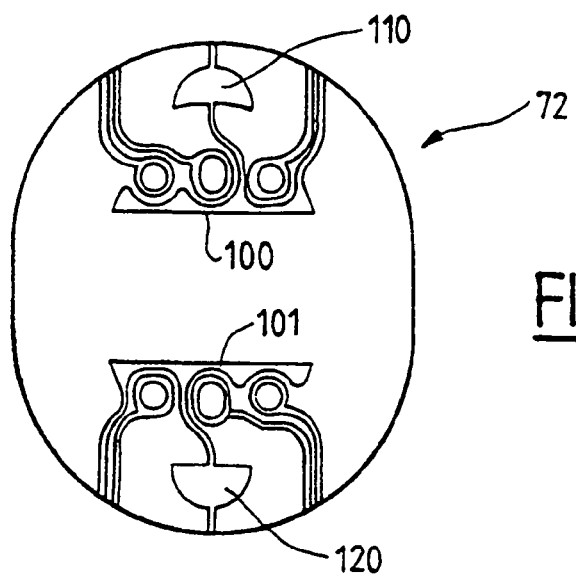
FIG_7C
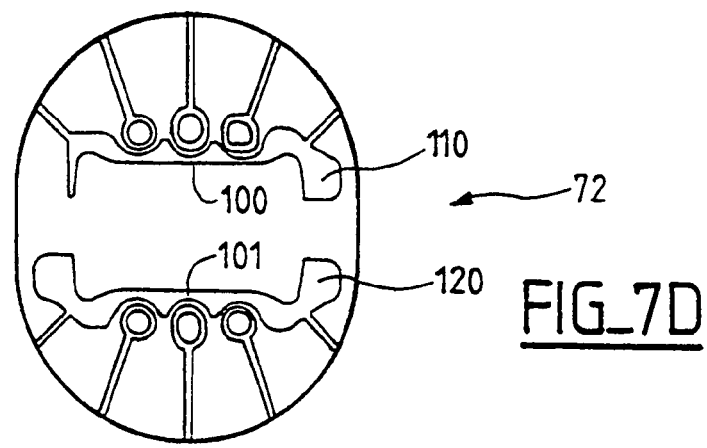
FIG_7D
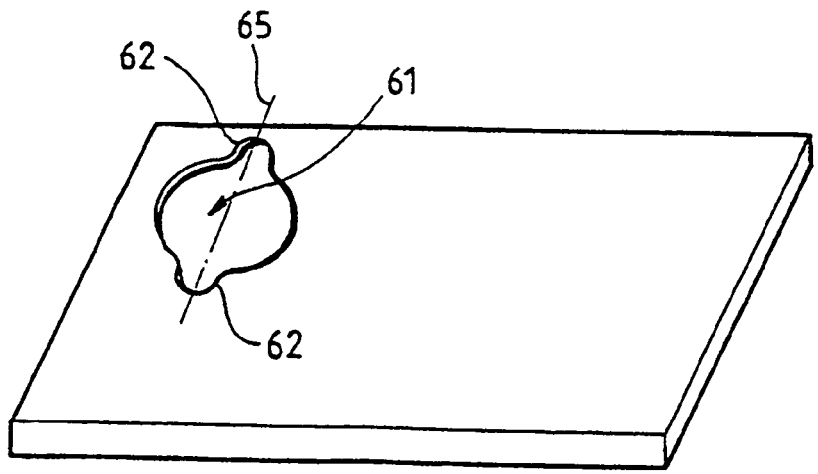
FIG_7E

METHOD FOR MAKING SMART CARDS

This application is a continuation of International Application No. PCT/FR98/02147, filed Oct. 8, 1998, which claims priority to French Patent Application No. 97/12530, Filed Oct. 8, 1997.

The invention concerns the manufacture of smart cards capable of operating with or without contact. These cards are provided with an antenna integrated in the card and a micromodule connected to the antenna. Information is exchanged with the exterior either by the antenna (therefore without contact) or by contacts flush with the surface of the card.

Throughout the rest of the description this type of card will be called a mixed card or mixed smart card.

The manufacturing method also concerns contactless smart cards, that is smart cards capable of operating without contact, information being exchanged with the exterior only through the antenna.

However, to simplify the following explanation only mixed cards will be referred to in what follows, although the method also extends to contactless smart cards, as has just been stated.

Mixed smart cards are intended to facilitate various operations, such as banking operations, telephonic communications, identification operations, operations for discharging or recharging units for account, and all kinds of operations which can be carried out either by inserting the card in a reader or remotely by electromagnetic coupling (in principle of the inductive type) between an emitter-receiver terminal and a card placed within the field of action of this terminal.

Mixed cards must have standardised dimensions identical to those of conventional smart cards fitted with contacts. This is also desirable for cards operating only without contact.

It will be recalled that cards with contact are defined by the usual standard ISO 7810, this definition being: a card which is 85 mm long, 54 mm wide and 0.76 mm thick. The flush contacts are at clearly defined positions on the surface of the card.

These standards impose severe constraints on manufacture. In particular, the very low thickness of the card (800 µm) is a major constraint, still more severe for mixed cards than for cards simply fitted with contacts, as incorporation of an antenna in the card must be provided for.

The technical problems which are posed are problems of positioning the antenna in relation to the card, as the antenna occupies almost the whole surface of the card, problems of positioning the integrated circuit module (comprising the microchip and its contacts) which makes possible the electronic operation of the card, and problems of the precision and reliability of the connection between the module and the antenna; finally, constraints of mechanical strength, reliability and manufacturing cost have to be taken into account.

The antenna is generally formed by a conductive element deposited as a thin layer on a plastic support sheet. At the ends of the antenna connecting pads are provided; these must be exposed in order to be able to connect with the contacts of the electronic module.

In the following description the conductive element forming the antenna will be called the antenna filament, given that, depending on the technology used, it may comprise a filament inlaid in the support sheet or printed tracks.

One approved solution for manufacturing mixed smart cards consists in using plastic foils pre-perforated in the area of the connecting pads of the antenna formed by the two ends of the antenna filament, in superimposing them on the sheet supporting the antenna and in assembling them by hot or cold lamination. The position of the connection pads of the antenna is limited by the position of the electronic module which is itself defined by the ISO standards.

A cavity to accommodate the electronic module must then be machined in the body of the card, between the connection pads of the antenna and above the perforations formed in the plastic foils covering the antenna; then the contacts of the electronic module must be connected to the connection pads of the antenna by depositing a conductive adhesive in the perforations. The antenna filament generally comprises several turns. These turns pass between the connection pads in such a way that they can be connected to these pads, which are located near the micromodule.

A first problem then arises from the nature of this structure. The turns may be damaged when the cavity is machined. Indeed, the turns can even be destroyed during this stage if the antenna is not positioned very precisely in relation to the position of the cavity.

The invention provides a solution for this first problem of the risk of damaging or even destroying the antenna. To this end the invention proposes a manufacturing method for smart cards, the said smart card comprising an antenna at the ends of which pads are provided for connection to an electronic module, characterised in that the method includes at least one stage consisting in producing the antenna comprising at least two turns, on a support sheet, the said antenna having its turns located outside the connecting pads, and in providing an insulating bridge so as to connect each of the antenna ends to a connection pad respectively.

This stage of the manufacturing method enables a free space to be provided between the connection pads of the antenna, in which space it is possible to form a cavity for the module without risk of damaging the turns of the antenna.

The insulating bridge is produced by covering the turns of the antenna with an insulating layer in one zone, then by depositing a conductive element on this insulating layer so as to connect one outside end of the antenna to one connection pad.

Another method of producing the insulating bridge consists in forming the antenna on each side of the support sheet, the connection pads being produced on the same side of the support sheet.

In addition, in the solution approved by the prior art, since the body of the card consists of a stack of several foils, the perforations formed in each foil must be superimposed. However, during the laminating stage the geometry of the perforations is not controlled and can fluctuate. Moreover, during this laminating stage the pressure becomes zero perpendicularly to the perforations whereas it is high over the body of the card. This difference in pressure causes the creation of a fault in the surface of the cards.

To avoid this problem of the deformation of the card, the invention proposes, in addition, to assemble together all the plastic foils which form the body of the card and then to machine the body of the card to form the cavity for the electronic module and the connection recesses provided to expose the connection pads of the antenna.

This machining is preferably done in a single stage, this being made possible thanks to the precise control of the position of the antenna in relation to the position of the cavity.

The fact that the cavity and the connecting recesses are machined simultaneously greatly simplifies and accelerates the manufacturing method.

In addition, the invention proposes a second solution to the problem of the risk of damaging or even destroying the antenna. It proposes, indeed, a method for manufacturing a smart card, said smart card comprising an antenna at the ends of which are provided pads connecting it to the electronic module, characterised in that the method comprises at least one stage consisting in machining a cavity and connecting recesses in an upper face of the body of the card, in such a way that the machining plane of the bottom of the cavity is situated above the plane of the antenna and the connection recesses are situated above the connection pads of the antenna and allow them to be exposed.

In addition, the connecting elements between the module and the antenna, which will be called the interconnection in what follows, can be damaged during testing of the cards by bending and twisting. To minimise the stresses on the interconnection during these tests the invention proposes that the antenna be located in an area of the card where the stresses are lowest. Thus, the foil supporting the antenna is located on or near the elastic neutral axis of the card. The neutral axis of a card is defined as being the layer situated at the centre of the thickness of the card.

In addition, after the machining of the cavity the antenna is generally connected to the electronic module by filling the connecting recesses with a conductive adhesive. When the module is installed in the card the heating time is too short to ensure correct polymerisation of the adhesive. In these conditions cards must spend a long period in an oven. In addition, given that the maximum temperature which the body of the card can withstand is generally below 100° C., it is difficult to ensure a good interconnection without deforming the body of the card. As a result, the manufacture of the card in these conditions is long and difficult, and cannot be adapted to mass-production.

The invention provides different solutions to this problem of interconnection. In particular, it proposes the use of a solder with low melting point, that is, a melting point well below 180° C., to produce the connection between the connection pads of the antenna and the electronic module. To this end, the solder comprises an alloy with a basis of indium and tin, or with a basis of bismuth, tin and lead, or with a basis of bismuth, indium and tin.

According to other characteristics, the connection between the connection pads of the antenna and the electronic module is formed by means of a conductive grease, or by means of a silicon gasket charged with metallic particles.

Other features and advantages of the invention will emerge from a reading of the description given by way of a non-limiting example, with reference to the attached drawings, in which FIG. 1 shows a schematic perspective view of an antenna of a smart card formed on a support sheet, FIG. 2 shows a schematic sectional view of an insulating bridge of the antenna of FIG. 1, FIG. 3 shows a schematic perspective view of another method of producing an antenna of a smart card, FIG. 4 shows a schematic perspective view of another method of producing an antenna of a smart card, FIGS. 5A to 5C show sectional views of a card during different stages of a manufacturing process according to the invention, FIG. 6 shows a schematic sectional view of a card produced according to another manufacturing method according to the invention FIG. 7A shows a top view of the flush contacts of a single-sided module, FIG. 7B shows a perspective view illustrating the position of the connection recesses in relation to a cavity formed in the body of a card, FIGS. 7C and 7D show two views of contacts on the interior face of double-sided modules, FIG. 7E shows a perspective view illustrating the position of the connection recesses in the cavity.

In general, mixed smart cards will be produced by the bonding (hot or cold lamination) of foils of plastic material in which the antenna conductor has been inserted or interposed; then by forming a cavity in the assembled foils, between the connection pads provided at the ends of the antenna conductor, in order to create a space intended to accommodate the electronic module with integrated circuit; and by installing this module so that two conductive pads of the module come into electrical contact with the connection pads of the antenna conductor, either directly or, more frequently, through the intermediary of a conductive linking element.

FIG. 1 shows a first method of producing an antenna 11 comprising at least two turns and intended to be enclosed in the body of a contactless smart card. Two connection pads 12 are provided at the ends of the antenna filament 11. An important stage in a manufacturing method of such a contactless smart card consists in producing the antenna 11, on a support sheet 10, in such a way as to define precisely its position in the body of the card in relation to the position of a cavity to be machined and intended to accommodate the electronic module.

According to a first manner of production, the turns of this antenna 11 are located outside the connection pads 12, and an insulating bridge 13 is formed so as to connect each end of the antenna to a connection pad 12 respectively, without creating a short-circuit. This manner of production allows a free space to be located between the connection pads 12 of the antenna 11, since no turn passes through it. The free space having been formed, the tracks of the antenna do not risk being damaged during a later stage when the cavity for the micromodule is machined, and the positioning tolerances are greatly increased.

FIG. 2 shows a sectional view along A-A of FIG. 1 and shows the insulating bridge 13 of the antenna 11. This insulating bridge 13 is produced by covering the turns of antenna 11 with an insulating layer 14 in a zone Z, then by depositing a conductive element 15 on this insulating layer 14, the conductive element 15 allowing the end of one turn, and in particular the end of the last turn situated the furthest towards the outside of the support sheet 10, to be connected to one of the connection pads 12 of the antenna.

According to another method of production, illustrated in FIGS. 3 and 4, the antenna 11 is formed on each side of the support sheet 10. In this case, connecting paths (metallic holes) 16, 17 are formed in the support sheet. The connection pads 12 of the antenna are formed on one face. The insulating bridge 13 is therefore produced by means of metallic holes to provide the connection between the antenna filaments located on each side of the support sheet 12 [sic], as shown schematically by broken lines in FIGS. 3 and 4.

The insulating bridge 13 thus allows the turns of the antenna to cross without directly overlapping and therefore without causing short-circuits.

After having produced this antenna on the support sheet 10, of plastic material, this support sheet 10 is assembled with other plastic sheets or foils 20, 30, 40, 50 and the sheets are bonded together by hot or cold lamination. This assembly stage is illustrated in FIG. 5A.

Foils 20 and 40 represent the upper and lower foils, which may be printed, of the body of the card. Foils 30 and 50 are upper and lower protective foils respectively, and are intended to protect the printed foils 20 and 40.

In one variant of the realisation, it is possible to add a sixth plastic foil and to position it just above the support sheet 10 in order to enclose antenna 11.

A later stage, illustrated in FIG. 5B, consists in machining a cavity 61 and connection recesses 62 in an upper face of the body of the card formed by the assembly of foils 10, 20, 30, 40 and 50. This machining may be done, for example, in a single stage.

The machining plane of cavity 61 is situated lower than the connection pads 12 of antenna 11. The connection recesses 62 are situated above the connection pads 12 of the antenna and enable these pads to be exposed.

The cavity and the connection recesses are machined by means of a milling cutter the feed depth of which is controlled.

The last stage of the procedure, shown in FIG. 5C, then consists in fixing an electronic module M in the cavity 61. The module M comprises on its lower side, facing towards the inside of the cavity, conductive pads 72 in electrical contact with connection pads 12 of the antenna by means of a conductive linking element 66 located in the connection recesses 62. The way in which the connection between the module and the antenna is established is explained in more detail in what follows.

A procedure for manufacturing a mixed smart card according to a different method of production and illustrated in FIG. 6 can be additionally envisaged to position the antenna precisely in relation to the cavity of the module.

According to this other method of realisation, antenna 11 is produced in the conventional way on a support sheet; that is, the turns of the antenna pass between the connection pads 12. The sheet supporting the antenna is then assembled with the other plastic foils; then the cavity 61 and the connection recesses 62 are machined in the upper surface of the body of the card formed by the assembly of foils. This stage is carried out in such a way that the machining plane of the bottom of the cavity 61 is situated above the plane of the tracks of the antenna 11 and that the connection recesses 62 are situated above the connection pads 12 of the antenna, enabling them to be exposed. The electronic module M is then fixed in the cavity and its conductive pads 72 are electrically connected to the connection pads 12 of the antenna through the connection recesses 62.

In all cases, the antenna 11 can be produced by incrustation on a plastic support sheet. The incrustation is carried out in a known manner by an ultrasound process.

Moreover, to minimise the stresses on the interconnection, especially during testing of the cards by bending or twisting, the invention proposes that the antenna be located on the elastic neutral axis of the card. Thus, it is envisaged that the sheet 10 supporting the antenna be located so as to form the neutral axis of the card. The neutral axis of a card is defined as being located at the centre of the thickness of the card.

In addition, in one variant of the procedure according to the invention it is possible to carry out the machining in such a way that the connection recesses pass through the connection pads 12 of the antenna. In this case, the electronic module is connected laterally, that is, through the cut edges of the connection pads, by applying a conductive connecting element to the connection recesses and to the lateral edges of the connection pads.

In general, the contact surface of the connection pads of the antenna is small, since it is of the same order of magnitude as the width of the conductive filament used to form the antenna (that is, some ten[s of] μm). As a result, the interconnection with the electronic module is difficult to carry out since it requires a high degree of precision. It is therefore preferable to produce the connection pads 12 such that they present a zigzag pattern in order to increase their contact surface. This zigzag pattern is produced by twists in the antenna filament (see FIG. 1, 3, 4).

The module M can be a single-sided printed circuit module or a double-sided printed circuit module, and in the latter case it can have two possible configurations, to which this description will return later.

A module M is shown in FIGS. 5 and 6 above the cavity 61. In these examples it is a double-sided printed circuit module comprising upper conductors 70 on the side which will face towards the outside of the cavity and lower conductors 72 on the side which will face towards the inside of the cavity. The conductors are formed on an insulating foil 80 and conductive paths which can link the upper conductors 70 and the lower conductors 72 [are provided]. A microchip embedded in a protective resin 74 is mounted on the lower face and connected to conductors 72 (and through them to conductors 70).

The module fits into the cavity 61 which has been machined to its dimensions. Two conductive pads of the lower face of the module, located just above the connection pads 12 of the antenna, are connected electrically to these two connection pads by a conductive linking element 66.

In one particularly interesting variant of the realisation, the module consists of a double-sided printed circuit carrying the integrated-circuit microchip, but this double-sided circuit is formed without a conductive path between the conductors on the two faces, making it less costly. In this case, the double-sided circuit comprises an insulating foil 80 carrying on one face a first set of conductive pads 70 intended to serve as access contacts to the smart card and on the other face a second set of conductive pads 72 intended to be connected to the antenna. Connecting filaments are soldered between the microchip and the first conductive pads through open zones of the insulating foil and other linking filaments are soldered between the microchip and the second set of conductive pads without passing through the insulating foil.

The definition of a single-sided module for a mixed card consists in finding the position of the contacts for the antenna, which presents the following difficulties:
- the contact zones defined by ISO and AFNOR standards cannot receive the contacts of the antenna since this can cause short-circuiting of the reader,
- on the assembly side, the resin protecting the microchip and the bonding resin eliminates the central zone of the module,
- the performance of the card with regard to resistance to bending necessitates the presence of a preferential deformation line without producing zones of embrittlement of the metal on the contact side.

FIG. 7A shows schematically a top view of the flush contacts of a smart card with a single-sided module which responds to these problems. The module comprises contact pads 1, 2, 3, 4, 5 and 1', 2', 3' 4' and 5', the positions of which are standardised by ISO and AFNOR standards. These contact pads are connected to the microchip to enable the module to operate. The position of the contact zones to be used to connect the module to the antenna can only be situated in the upper zones 6 and 7 and the lower zones 8 and 9 on either side of an axis 65 of the module, that is, outside the contact zones defined by the ISO standard.

In these conditions, therefore, the positions of the connection pads of the antenna and of the connection recesses in the body of the card are limited by the standardised position of the contact zones of the electronic module and by the position of this module in the body of the card, which is itself defined by the ISO standards.

FIG. 7B illustrates the case in which the connection recesses 62, and therefore the corresponding connection pads, are situated side-by-side and on each side of the mid-perpendicular 65 of the cavity 61. This case corresponds to the case in which the contact zones 6 and 7 of the module in FIG. 7A are electrically connected to the connection pads of the antenna.

Furthermore, the use of a double-sided module must also be able to overcome the disadvantages mentioned with regard to the single-sided module.

The contacts illustrated in FIGS. 7C and 7D provide a solution to these problems. In particular, the presence of two tracks 100, 101 on either side of the circuit allows different configurations of microchips to be connected to the same module.

These two methods of producing the contacts for the double-sided module comprise at least one track with its edge parallel to the microchip, connected to contact zones 110 and 120. These zones 110 and 120 represent the possible contact zones with the antenna.

FIG. 7E illustrates the case in which the connection recesses 62, and therefore the connection pads of the antenna, are diametrically opposite each other and situated on a mid-perpendicular 65 of the cavity. This case corresponds to that in which the contact zones 110 and 120 of the module in FIG. 7C are electrically connected to the connection pads of the antenna.

FIGS. 7B and 7E illustrate connection recesses formed continuously with the cavity, giving them the special shape shown in the diagrams. Of course, these recesses could be formed non-continuously with the cavity and appear as holes of any shape provided that their positioning is as defined previously.

The interconnection between the electronic module and the antenna may be made with the aid of a conductive linking element of the type of solder. However, in general the remelt temperature of these products is very high, in the region of 180° C. These temperatures are incompatible with the plastic materials used to form the body of the card, which cannot withstand temperatures much above 100° C.

The invention proposes that a solder with low melting point be used to ensure good compatibility with the card body. For this, it is preferable to use a solder comprising an alloy with a basis of indium and tin, or with a basis of bismuth, tin and lead, or a basis of bismuth, tin and indium.

In the case of an alloy of indium and tin, the solder comprises not more than 52% by weight of indium and 48% by weight of tin. With this composition the melting point of the solder is 118° C.

In the case of an alloy of bismuth, tin and lead, the solder comprises not more than 46% by weight of bismuth and 34% by weight of tin and 20% by weight of lead. With this composition the melting point of the solder is 100° C.

In the case of an alloy of bismuth, indium and tin, the solder comprises not more than 57% by weight of bismuth, 26% by weight of indium and 17% by weight of tin. With this composition the melting point of the solder is 79° C.

Another method of producing the interconnection consists in depositing conductive grease charged with metallic particles in the connection recesses. Contact is then made by friction and ensures electrical conduction between the antenna and the module, and does so regardless of the mechanical stresses applied to the card.

A third method of producing the interconnection consists in using a silicon gasket charged with metallic particles. This solution has the advantage of providing a very supple connecting joint. In this case, the dimensions of the silicone gasket are greater than the depth of the connection recesses so that the silicon is compressed and the metallic particles are brought into contact.

Regardless of which solution is adopted, the reliability of the interconnection between the antenna and the module can be increased by using balls of gold deposited on the conductive pads 72 of the module. These balls of gold do not provide the connection but increase the bonding surface and modify the distribution of stresses in the conductive joint when the card is subjected to mechanical loads. These balls are deposited by thermo-compression. Moreover, they can be stacked in order to increase the height of the contact surface.

The invention claimed is:

1. A method for manufacturing smart cards, each having an antenna with ends or connection pads for connection to an electronic module, comprising the following steps:
producing, on a support sheet, the antenna with at least two turns and a pair of connection pads in a layout in which no turns of the antenna are disposed between the pair of connection pads, and electrically connecting at least one of the ends of the antenna to a respective one of said connection pads by means of a bridge disposed on a surface of said turns that is away from said support sheet.

2. A method according to claim 1, wherein the bridge is produced by covering the turns of the antenna with an insulating layer in one zone and depositing on this insulating layer a conductive element so that one end of the antenna can be connected to one connection pad.

3. A method according to claim 2, further comprising the following steps:
assembling the support sheet to plastic foils to form a card body;
machining cavity and connection recesses in an upper face of the card body, so that the machined plane of the cavity is situated below the plane of the connection pads of the antenna, and the connection recesses are situated above the connection pads of the antenna in order to expose said pads; and
fixing an electronic module into the cavity, the module having on its lower side, facing towards the inside of the cavity, conductive pads in electrical contact with the connection pads of the antenna by means of a conductive linking element located in the connection recesses.

4. A method according to claim 1, further comprising the following steps:
assembling the support sheet to plastic foils to form a card body,
machining a cavity and connection recesses in an upper face of the card body, so that the machined plane of the cavity is situated below the plane of the connection pads of the antenna, and the connection recesses are situated above the connection pads of the antenna in order to expose said pads, and
fixing an electronic module into the cavity, the module having on its lower side, facing towards the inside of the cavity, conductive pads in electrical contact with the connection pads of the antenna by means of a conductive linking element located in the connection recesses.

5. A method according to claim 4, wherein the support sheet is located between the plastic foils so as to form the neutral axis of the card.

6. A method according to claim 4, wherein the machining of the connection recesses is carried out through the connection pads of the antenna.

7. A method according to claim 4, wherein the connection recesses are diametrically opposite each other and are situated on a mid-perpendicular of the cavity.

8. A method according to claim 4, wherein the connection recesses are situated side-by-side and on either side of a mid-perpendicular of the cavity.

9. A method according to claim 4, wherein the electronic module comprises an integrated circuit microchip and a double-sided printed circuit without conductive paths between its two faces, the double-sided circuit comprising an insulating foil having on one face a first set of conductive pads that form access contacts for the smart card, and on the other face a second set of conductive pads that are connected to the antenna, and wherein said connection pads comprise contact zones located on the same side of the cavity and on either side of a mid-perpendicular of this cavity, or on a mid-perpendicular of the cavity on two opposite sides, each said contact zone being extended by a track with its edge parallel to the electronic module.

10. A method according to claim 1, wherein the antenna is produced by incrustation on the support sheet.

11. A method according to claim 1, wherein the connection pads are produced in a zigzag pattern.

12. A method according to claim 1, wherein the electronic module comprises an integrated circuit microchip and a single-sided printed circuit having flush contact zones defined by an ISO standard, and wherein said pads are located outside the contact zones defined by the ISO standard.

13. A method according to claim 1, wherein the connection between the connection pads of the antenna and the module is formed by a solder with a low melting point.

14. A method according to claim 13, wherein the solder comprises an alloy with a basis of indium and tin.

15. A method according to claim 13, wherein the solder comprises not more than 52% by weight of indium and 48% by weight of tin.

16. A method according to claim 13, wherein the solder comprises an alloy with a basis of bismuth, tin and lead.

17. A method according to claim 16, wherein the solder comprises not more than 46% by weight of bismuth, 34% by weight of tin and 20% by weight of lead.

18. A method according to claim 13, wherein the solder comprises an alloy with a basis of bismuth, tin and indium.

19. A method according to claim 18, wherein the solder comprises not more than 57% by weight of bismuth, 26% by weight of indium and 17% by weight of tin.

20. Manufacturing method according to claim 19, wherein the connection between the connection pads of the antenna and the conductive pads of the module (M) is formed by means of a grease charged with metallic particles.

21. Manufacturing method according to claim 19, wherein the connection between the connection pads of the antenna and the conductive pads of the module (M) is formed by means of a silicon gasket charged with metallic particles.

22. A method cording to claim 1, wherein the connection between the connection pads of the antenna and of the module is formed by means of a grease charged with metallic particles.

23. A method according to claim 1, wherein the connection between the connection pads of the antenna and the module is formed by means of a silicon gasket charged with metallic particles.

24. A method according to claim 1, further including the step of depositing balls of gold by thermo compression on the module in order to increase the bonding surface between the module and the antenna.

25. A method for manufacturing smart cards, comprising the following steps:
producing, on a support sheet, an antenna with at least two turns, a pair of connection pads that are both disposed on a common side of said antenna turns, an insulator disposed across said turns, and a connective link on said insulator that connects the opposite side of said turns to one of said connection pads;
laminating the support sheet to plastic foils to form a card body;
machining a cavity in one face of the card body, to expose said connection pads; and
fixing an integrated circuit chip into the cavity such that conductive pads on the lower side of the chip, facing towards the inside of the cavity, are in electrical contact with the connection pads of the antenna.

26. The method of claim 25 wherein said integrated circuit chip is disposed within a module having conductors on one side for connecting said chip to said connection pads, and conductors on the opposite side that provide access to the smart card.

27. A method for manufacturing a sheet support having an antenna with a pair of ends or pads for connection to an electronic chip, comprising producing, on a face of a support sheet, at least two turns of the antenna and a pair of ends or pads in a layout in which no turns of the antenna are disposed between the pair of ends or pads, wherein a conductive segment crosses over at least one turn of the at least two turns while being electrically insulated from the at least one turn of the at least two turns.

28. The method for manufacturing a sheet support of claim 27, wherein the antenna is produced by incrustation on the support sheet.

29. The method for manufacturing a sheet support of claim 27, wherein the sheet support is a smart card.

30. The method for manufacturing a sheet support of claim 27, further comprising producing an insulating bridge on the face of the support sheet where the conductive segment crosses over at least one turn of the at least two turns.

31. A method for making an assembly of sheets including an antenna with two ends and an electronic chip, comprising:
producing, on a support sheet, the antenna including at least two turns and a conductive element electrically insulated from the turns and crossing over or under at least one turn of the at least two turns in a layout in which no turns of the antenna are disposed between the two ends; and
forming an assembly of sheets including the support sheet and a cavity in one side of the assembly of sheets, an electronic chip being attached or located in the cavity, the chip having conductor pads in electrical contact with the antenna ends.

32. The method according to claim 31, wherein the cavity includes connection recesses communicating with the cavity.

33. The method according to claim 31, wherein the electronic chip is connected to contact areas oriented toward the outside of the assembly of sheets.

34. The method according to claim 31, wherein the cavity is made previously in one sheet before receiving the electronic chip.

35. The method according to claim 31, wherein the electronic chip is mounted on a module.

36. The method according to claim 35, wherein the cavity is made previously in one sheet before receiving the module.

37. A method for manufacturing a sheet assembly comprising an antenna connected to a chip, the method comprising producing, on a face of a support sheet, at least two turns of the antenna with a pair of ends or pads for electrically connecting the chip in a layout in which no turns of the antenna are disposed between the pair of ends or pads, wherein a conductive segment crosses over at least one turn of the at least two turns while being electrically insulated from the at least one turn of the at least two turns.

38. A method for manufacturing a sheet support having an antenna with a pair of ends or pads for connection to an electronic chip, comprising producing, on a face of a support sheet, at least two turns of the antenna and a pair of ends or pads in a layout in which no turns of the antenna are disposed between the pair of ends or pads, wherein a conductive segment crosses over at least one turn of the at least two turns while being electrically insulated from the at least one turn of the at least two turns so that both ends or pads are on a common side of the at least two turns.

39. A method for making a sheet assembly including an antenna with two ends or pads and an electronic chip, comprising:

producing, on a support sheet, at least two turns of the antenna and a conductive element electrically insulated from the turns and crossing over or under at least one turn of the at least two turns in a layout in which no turns of the antenna are disposed between the two ends; and forming a sheet assembly including the support sheet and a chip housing and/or holes for containing and/or connecting the electronic chip to the antenna through the housing and/or the holes.

* * * * *